(12) United States Patent
Häger et al.

(10) Patent No.: US 8,970,438 B2
(45) Date of Patent: Mar. 3, 2015

(54) METHOD OF PROVIDING AN ANTENNA MAST AND AN ANTENNA MAST SYSTEM

(75) Inventors: Peter Häger, Djursholm (SE); Anders Röhl, Enskede (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 128 days.

(21) Appl. No.: 13/025,531

(22) Filed: Feb. 11, 2011

(65) Prior Publication Data

US 2012/0206306 A1 Aug. 16, 2012

(51) Int. Cl.
| | |
|---|---|
| *H01Q 1/00* | (2006.01) |
| *H01Q 1/06* | (2006.01) |
| *H01Q 1/12* | (2006.01) |
| *H01Q 15/20* | (2006.01) |
| *H01Q 15/14* | (2006.01) |
| *H01Q 1/44* | (2006.01) |

(Continued)

(52) U.S. Cl.
CPC .............. *H01Q 1/44* (2013.01); *H01Q 1/1242* (2013.01); *H01Q 1/246* (2013.01); *B60L 11/1816* (2013.01); *B60L 11/1825* (2013.01); *B60L 2230/16* (2013.01); *B60L 2230/40* (2013.01); *Y02T 10/7088* (2013.01); *Y02T 10/7005* (2013.01); *Y02T 90/16* (2013.01); *Y02T 90/163* (2013.01); *Y02T 90/168* (2013.01); *Y02T 90/121* (2013.01); *Y02T 90/14* (2013.01); *Y02T 90/128* (2013.01); *Y04S 30/12* (2013.01)
USPC ........... 343/720; 343/721; 343/890; 343/915; 343/916

(58) Field of Classification Search
CPC .. H01Q 1/1242; Y02T 10/7088; E04H 12/34; E04H 15/44; E04H 15/60; E04H 12/22; E04H 12/32; E04H 17/263; E04H 4/0031; E04H 4/0043
USPC ................. 343/890, 872, 721, 720, 742, 800; 52/40
See application file for complete search history.

(56) References Cited

U.S. PATENT DOCUMENTS 4,377,812 A * 3/1983 Gobel et al. .................. 343/872
5,673,886 A * 10/1997 Negishi ...................... 248/218.4

(Continued)

FOREIGN PATENT DOCUMENTS

| | | |
|---|---|---|
| CN | 1354898 A | 6/2002 |
| EP | 0818720 A1 | 1/1998 |

(Continued)

*Primary Examiner* — Dameon E Levi
*Assistant Examiner* — Ricardo Magallanes
(74) *Attorney, Agent, or Firm* — Coats & Bennett, PLLC (57) ABSTRACT

A method of providing an antenna mast for a wireless communication system is presented. The method comprises selecting a lower module and an upper module from a set of modules. This set of modules comprises at least two different lower modules, at least two different upper modules, or at least two different lower modules and at least two different upper modules. The method further comprises assembling the selected lower module and the selected upper module into a mast body of the antenna mast. This mast body forms a supporting structure for an antenna arrangement of the wireless communication system. In assembling the mast body, the method includes the antenna arrangement in the selected upper module and includes in at least one of the selected lower module and the selected upper module a device configured to perform a function other than supporting the antenna arrangement.

31 Claims, 8 Drawing Sheets

(51) Int. Cl.
*H01Q 1/24* (2006.01)
*B60L 11/18* (2006.01)

(56) References Cited

U.S. PATENT DOCUMENTS

| | | | |
|---|---|---|---|
| 5,986,576 A | 11/1999 | Armstrong | |
| 6,222,503 B1* | 4/2001 | Gietema et al. | 343/890 |
| 6,380,909 B1 | 4/2002 | Wilkinson et al. | |
| 6,462,665 B1 | 10/2002 | Tarlton et al. | |
| 6,912,408 B1* | 6/2005 | O'Neill et al. | 455/561 |
| 2006/0142066 A1 | 6/2006 | Lauper | |
| 2007/0188303 A1 | 8/2007 | Faro et al. | |
| 2007/0279491 A1* | 12/2007 | Riviere | 348/143 |
| 2010/0013434 A1* | 1/2010 | Taylor-Haw et al. | 320/109 |
| 2010/0026604 A1* | 2/2010 | Caldwell et al. | 343/890 |
| 2010/0231469 A1* | 9/2010 | Kim | 343/721 |
| 2010/0254282 A1 | 10/2010 | Chan et al. | |
| 2010/0283426 A1* | 11/2010 | Redmann | 320/109 |

FOREIGN PATENT DOCUMENTS

| | | |
|---|---|---|
| EP | 1198024 A1 | 4/2002 |
| GB | 2337538 A | 11/1999 |
| GB | 2408395 A | 5/2005 |
| JP | H0653894 A | 2/1994 |
| JP | 2001059365 A | 3/2001 |
| JP | 2003051084 A | 2/2003 |
| JP | 2005318077 A | 11/2005 |
| WO | 9950926 A1 | 10/1999 |
| WO | 0178190 A1 | 10/2001 |
| WO | 0250943 A1 | 6/2002 |
| WO | 02073736 A1 | 9/2002 |
| WO | 2004100617 A1 | 11/2004 |
| WO | 2006081679 A1 | 8/2006 |
| WO | 2007108731 A1 | 9/2007 |
| WO | 2007136241 A1 | 11/2007 |
| WO | 2011004214 A1 | 1/2011 |

* cited by examiner

METHOD OF PROVIDING AN ANTENNA MAST AND AN ANTENNA MAST SYSTEM

TECHNICAL FIELD

The technical field concerned relates to a method of providing an antenna mast for a wireless communication system and a modular antenna mast system for providing antenna masts of a wireless communication system.

BACKGROUND

Wireless communication systems using radio communication comprise transceiver arrangements and processors comprised in what may be referred to as base stations, radio network controllers, or node B's. Furthermore, antennas are connected to the transceiver arrangements and are required for transmitting and receiving radio signals. The antennas may for instance be arranged on an antenna mast. A variety of masts have been suggested in the prior art but in practice a steel lattice mast is the most common type of mast used.

Wireless communication such as mobile internet access by means of mobile communication equipment is demanded by more people and more devices. Thus, radio traffic within the wireless communication systems increases and so does the required number of access points for the mobile communication equipment. For each access point at least one antenna is required and thus the number of antennas that are required increases with the increased demand in mobile internet access.

EP1198024 discloses an antenna mast wherein an antenna is raised and lowered along a guiding means inside the antenna mast. According to one embodiment, the antenna mast comprises a carrying pipe for a lamp.

U.S. Pat. No. 6,335,709 discloses a service tower integrating a water tank and an antenna mast in a single structure.

EP1286412 discloses a radio tower with a central supporting tower structure comprising several modules of the same outer shape being arranged one above the other. The modules house for instance transmission and power supply equipment. Further the tower comprises stiff ring-shaped portions of covering made from glass fibre reinforced plastic material, inside which the modules of the radio tower are arranged. Each ring-shaped covering is supported by a module of the radio tower. On the outside of the covering, screens for providing information or announcements may be arranged. Also the use of the covering for housing small shops or ticket machines is suggested.

WO98/58420 discloses a wireless communication pole system. The system is fully integrated for rapid installation. The system comprises a pole, a base assembly, and an antenna assembly. According to one embodiment the pole doubles as a banner-carrying light pole.

A high number of access points, and accordingly antennas, for wireless communication systems puts a requirement on associated antenna masts to be accepted by the public. Providing a further function other than supporting an antenna arrangement in connection with an antenna mast, as disclosed in the above-mentioned prior art documents, may facilitate such acceptance.

For instance in situations when a number of antenna masts are required in a restricted area, there exists a need to provide different further functions in the number of antenna masts to maintain the public acceptance. However, providing such a number of different further functions in connection with a number of antenna masts may prove to be a problem. The manufacturing and installation of such a number antenna masts may be complicated and costly.

SUMMARY

An object is thus to at least alleviate the above mentioned problem.

According to one aspect, the object is achieved by a method of providing an antenna mast for a wireless communication system. The antenna mast comprising a mast body adapted to form a supporting structure for an antenna arrangement of the wireless communication system. The mast body comprises a lower module and an upper module. The upper module is adapted to comprise the antenna arrangement. At least one of the lower module and the upper module is adapted to comprise a device to be utilized for a further function other than supporting the antenna arrangement. The method comprises:
  selecting a lower module and an upper module from a set of modules comprising at least two different lower modules and/or at least two different upper modules, and
  assembling the mast body including the selected lower module and the selected upper module to form an assembled mast body.

Since the antenna mast provided according to the method, assembled including the selected lower module and upper module, may be designed for a specific further function, which may be different than a further function provided in a different antenna mast assembled from the same set of modules, high flexibility in the adaptation of antenna masts is provided. As a result, the above mentioned object is achieved.

The use of a set of modules comprising different lower modules and/or different upper modules may be a rational and advantageous way of manufacturing different antenna masts adapted to specific requirements at different antenna mast sites. For example, if the antenna mast site is an intersection between two streets, the device to be utilized for the further function may be a traffic light or a street sign. Accordingly, a lower module forming a base of the mast body may be selected from the set of modules and an upper module adapted to receive the lights of a traffic light, or adapted to form the street sign, may be selected from the set of modules. At a different example antenna mast site there may be a bus stop, in which case a lower module comprising a bench may be selected from the set of modules and an upper module adapted to support the antenna arrangement may be selected from the set of modules. A further example antenna mast site may be situated in a park area, in which case a lower module selected from the set of modules may comprise a waste bin and the upper module selected from the set of modules may be adapted to comprise a street light. Since different mast bodies may be provided, the antenna masts at different sites assembled from the set of modules may blend in well in a present environment. Public acceptance of antenna masts will thus be achieved in a rational manner.

The upper module being adapted to comprise the antenna arrangement encompasses that the antenna arrangement may be mounted to the upper module or arranged inside the upper module. The antenna arrangement is arranged at an elevated position on the antenna mast. Accordingly, the antenna arrangement may be provided at a top of the upper module, or it is alternatively foreseen that some portions of the upper module may be provided above the antenna arrangement. It is to be understood that the set of modules comprises at least one lower and one upper module, and at least one further of the lower and upper modules.

Different technologies may be used in wireless communication systems, such as Long Term Evolution (LTE), LTE- Advanced, 3rd Generation Partnership Project (3GPP) Wideband Code Division Multiple Access (WCDMA), Global System for Mobile Communications/Enhanced Data rate for GSM Evolution (GSM/EDGE), Worldwide Interoperability for Microwave Access (WiMax), or Ultra Mobile Broadband (UMB), just to mention a few possible implementations. A wireless communication system may comprise transceiver arrangements and processors providing radio coverage over at least one respective geographical area forming a cell. User equipment, such as mobile telephones, are served in the cells by the respective transceiver arrangements and processors and communicate with the respective transceiver arrangements and processors. An antenna mast may be erected at an antenna site in a cell. Typically, such antenna sites are outdoors in areas frequented by the public. In such areas, use of wireless communication systems is to be expected.

According to embodiments the further function may be a function other than a function directly related to the wireless communication system. It is to be understood that the device to be utilized for the further function of a specific assembled antenna mast may make use of the wireless communication system but the device is not involved in communication between random users of the wireless communication system utilizing the antenna arrangement of the specific assembled antenna mast. Put differently, the communication between the random users of the wireless communication system is performed independently of any communication relating to the device to be utilized for the further function. A device to be utilized for a further function may communicate e.g. its status of operation to a service provider via the wireless communication system.

According to embodiments assembling may comprise:
arranging the lower module substantially below the upper module in the assembled mast body.

According to embodiments the method may comprise:
manufacturing the lower modules, and the upper modules of the set of modules to form at least part of an outer surface of the assembled mast body. In this manner a mast body assembled from the set of modules may comprise a continuous outer surface.

According to embodiments the method may comprise:
manufacturing lower modules to form a supporting structure which is adapted to carry at least a weight of an upper module and devices arranged in the upper module of an assembled mast body. In this manner a lower module may carry the weight of an assembled mast body and be fastened to the ground to support the relevant antenna mast.

According to embodiments the method may comprise:
arranging the device to be utilized for the further function substantially within the outer surface of the assembled mast body. In this manner the device to be utilized for the further function may blend in well with the mast body to form a homogeneous antenna mast. The device to be utilized for the further function may be protectedly arranged in the antenna mast body.

According to embodiments the method may comprise:
providing an antenna mast having a height of 3-8 meters.

According to embodiments the method may comprise:
arranging a particular device to be utilized for the further function in the assembled mast body in dependence of the selected modules from the set of modules. The arranging of a particular device to be utilized for the further function in the mast body may thus depend on which specific module is selected from the set of modules. The device may be arranged in a module before the mast body is assembled or after the mast body has been assembled.

According to embodiments the method may comprise:
arranging at least a transmitter, and/or a receiver, and a processor of the wireless communication system inside the selected lower and/or upper modules. In this manner the antenna mast may house these components of the wireless communication system. The arranging of the transmitter, and/or the receiver, and the processor inside the lower and/or upper modules may be done before the mast body is assembled or after the mast body has been assembled.

According to embodiments the method may comprise:
providing the device to be utilized for the further function in connection with the lower module of the assembled mast body.

According to embodiments the method may comprise:
selecting the device to be utilized for the further function from the group of: a bench, a roof arrangement, a waste bin, a vending machine, an electronic screen, a parking meter, a traffic light, a lighting arrangement, a card-reading device, an electric power socket, or a life-saving device such as a defibrillator. Different functions, services, and devices may thus be provided. A bench may be provided at antenna mast sites where members of the public may want to sit down. A roof arrangement may be provided at antenna mast sites where members of the public may need shelter from precipitation or the sun. A waste bin may be provided at an antenna mast site which is frequented by many people. A vending machine may be provided at an antenna mast site which is frequented by many people. An electronic screen may be provided at an antenna mast site where there is a need or requirement to provide information to one or more persons. A parking meter may be provided at an antenna mast site in vicinity of a vehicle parking facility. One or more traffic lights may be provided at an antenna mast site at a roadside, in a street intersection, or at a crossing for pedestrians. A card-reading device may be provided e.g. at an antenna mast sites where a service provider may want to charge for services provided, e.g. at a vehicle parking facility, an electric vehicle charging arrangement, a public transportation station, etc. An electric power socket may be provided at an antenna mast site where electric vehicles may be charged. A life-saving device, such as a defibrillator, or an oxygen container and mask, may be provided at an antenna mast site which is frequented by many people or a site where there may be a particular reason to provide such equipment.

According to embodiments the method may comprise:
providing the device to be utilized for performing the further function besides the antenna arrangement in connection with the upper module of the assembled mast body.

According to embodiments the method may comprise:
selecting the device to be utilized for the further function from a group of: a sign, a lighting arrangement, a clock, a roof arrangement, a traffic light, or an electronic screen. Different functions, services, and devices may thus be provided. A sign may be provided at an antenna mast site where information is to be displayed to members of the public. A lighting arrangement such as one or more lamps may be provided at an antenna mast site frequented by members of the public at dark hours. A clock may be provided at an antenna mast site near a public transportation station. A roof arrangement may be provided at an antenna mast site where members of the public may need shelter from precipitation or the sun. One or more traffic lights may be provided at an antenna mast site at a roadside, in a street intersection, or at a crossing for pedestrians. An electronic screen may be provided at an antenna mast site where there is a need or requirement to provide information to one or more persons.

According to embodiments the set of modules may comprise at least two different lower modules and/or at least two different middle modules and/or at least two different upper modules, and wherein selecting may comprise:
selecting a middle module from the set of modules, and assembling may comprise:
assembling the mast body including the selected middle module to form the assembled mast body. In this manner antenna masts comprising a middle module besides upper and lower modules may be provided. The middle modules being comprised in the set of modules ensures flexibility to provide an antenna mast adapted for a specific antenna mast site. More and/or different combinations of modules are provided.

According to embodiments, assembling the antenna mast body may comprise:
arranging the middle module substantially between the lower module and the upper module.

According to embodiments the method may comprise:
providing the device to be utilized for the further function in connection with the middle module.

According to embodiments the method may comprise: selecting the device to be utilized for the further function from a group of: a traffic light, an electronic screen, a roof arrangement, or a lighting arrangement. Different functions, services, and devices may thus be provided. One or more traffic lights may be provided at an antenna mast site at a roadside, in a street intersection, or at a crossing for pedestrians. An electronic screen may be provided at an antenna mast site where there is a need or requirement to provide information to one or more persons. A roof arrangement may be provided at an antenna mast site where members of the public may need shelter from precipitation or the sun. A lighting arrangement such as one or more lamps may be provided at an antenna mast site frequented by members of the public at dark hours.

According to embodiments a lower module of the set of modules may form a supporting structure which is adapted to carry a weight of a middle module, an upper module, and devices arranged in the middle and upper modules. In this manner a lower module may carry the weight of an assembled mast body and be fastened to the ground to support the relevant antenna mast.

According to a further aspect, the object is achieved by a modular antenna mast system for providing antenna masts of a wireless communication system, at least some of the antenna masts of the antenna mast system each comprising a mast body adapted to form a supporting structure for an antenna arrangement of the wireless communication system. The mast body comprises a lower module and an upper module, the upper module being adapted to comprise the antenna arrangement. At least one of the lower module and the upper module is adapted to comprise a device to be utilized for a further function other than supporting the antenna arrangement. The antenna mast system comprises a set of modules comprising lower and upper modules, wherein the set of modules comprises at least two different lower modules and/or at least two different upper modules such that differently configured mast bodies comprising a lower and an upper module are able to be assembled from the set of modules.

Since the antenna mast system comprises a set of modules from which differently configured mast bodies are assembled, an antenna mast may be designed for a specific further function, which may be different than a further function provided in a different antenna mast assembled from the same set of modules. Again, high flexibility in the adaptation of antenna masts to a particular antenna site is provided. As a result, the above mentioned object is achieved.

According to embodiments the further function may be a function other than a function directly related to the wireless communication system. It is to be understood that the device to be for the further function of a specific assembled antenna mast may make use of the wireless communication system but the device is not involved in communication between random users of the wireless communication system utilizing the antenna arrangement of the specific assembled antenna mast. For instance, a device to be utilized for a further function may communicate its status of operation to a service provider via the wireless communication system.

According to embodiments a lower module may be arranged substantially below an upper module in an assembled mast body of an antenna mast of the antenna mast system.

According to embodiments a lower module and an upper module may form at least part of an outer surface of an assembled mast body of an antenna mast of the antenna mast system. In this manner a mast body assembled from the set of modules may comprise a continuous outer surface.

According to embodiments a lower module of the set of modules may form a supporting structure which is adapted to carry at least a weight of an upper module and devices arranged in the upper module of an assembled mast body. In this manner a lower module may carry the weight of an assembled mast body and be fastened to the ground to support the relevant antenna mast.

According to embodiments an assembled mast body of an antenna mast of the antenna mast system may be adapted to house the device to be utilized for the further function substantially within the outer surface of the assembled mast body. In this manner the device to be utilized for the further function may blend in well with the mast body to form a homogeneous antenna mast. The device to be utilized for the further function may be protectedly arranged in the antenna mast body.

According to embodiments at least some of the antennas masts of the antenna mast system may have a height of 3-8 meters.

According to embodiments the differently configured mast bodies of the modular antenna mast system may be arranged to comprise different devices to be utilized for the further function depending on which modules are selected from the set of modules for a particular mast body. The arranging of a particular device to be utilized for the further function in the mast body may thus depend on which specific module is selected from the set of modules. The device may be arranged in a module before the mast body is assembled or after the mast body has been assembled.

According to embodiments at least one of the differently configured mast bodies may be adapted to house therein at least a transmitter and/or a receiver and a processor of the wireless communication system. In this manner an antenna mast with a mast body may be provided, which may be adapted to provide for the device for performing the further function, and which also may house key components of the wireless communication system.

According to embodiments at least one lower module of the set of modules may be adapted to comprise the device to be utilized for the further function.

According to embodiments the device to be utilized for the further function may comprise a bench, a roof arrangement, a waste bin, a vending machine, an electronic screen, a parking meter, a traffic light, a lighting arrangement, a card-reading device, an electric power socket, or a life-saving device such as a defibrillator.

According to embodiments at least one upper module of the set of modules may be adapted to comprise the device to be utilized for the further function, besides the antenna arrangement.

According to embodiments the device to be utilized for the further function may comprises: a sign, a lighting arrangement, a clock, a roof arrangement, a traffic light, or an electronic screen.

According to embodiments the set of modules may comprise at least two different lower modules and/or at least two different middle modules and/or at least two different upper modules such that differently configured mast bodies comprising a middle module are able to be assembled from the set of modules. In this manner antenna masts comprising a middle module besides upper and lower modules may be provided. The middle modules being comprised in the set of modules ensures flexibility to provide an antenna mast adapted for a specific antenna mast site.

According to embodiments a middle module may be arranged substantially between a lower module and an upper module of an assembled mast body of an antenna mast of the antenna mast system.

According to embodiments at least one middle module of the set of modules may be adapted to comprise the device to be utilized for the further function.

According to embodiments the device to be utilized for the further function may comprise: a traffic light, an electronic screen, a roof arrangement, or a lighting arrangement.

According to embodiments a lower module forms a supporting structure which is adapted to carry a weight of a middle module, an upper module, and devices arranged in the middle and upper modules. In this manner a lower module may carry the weight of an assembled mast body and be fastened to the ground to support the relevant antenna mast.

Further features of, and advantages, will become apparent when studying the appended claims and the following detailed description. Those skilled in the art will realize that different features of embodiments may be combined to create embodiments other than those described in the following, without departing from the scope defined by the appended claims.

BRIEF DESCRIPTION OF THE DRAWINGS

The various aspects of embodiments, including particular features and advantages, will be readily understood from the following detailed description and the accompanying drawings, in which.

DETAILED DESCRIPTION

Embodiments will now be described more fully with reference to the accompanying drawings, in which example embodiments are shown. The embodiments set forth herein should not be construed as limiting. Disclosed features of example embodiments may be combined as readily understood by one of ordinary skill in the art. Like numbers refer to like elements throughout.

Well-known functions or constructions will not necessarily be described in detail for brevity and/or clarity.

Figure 1:
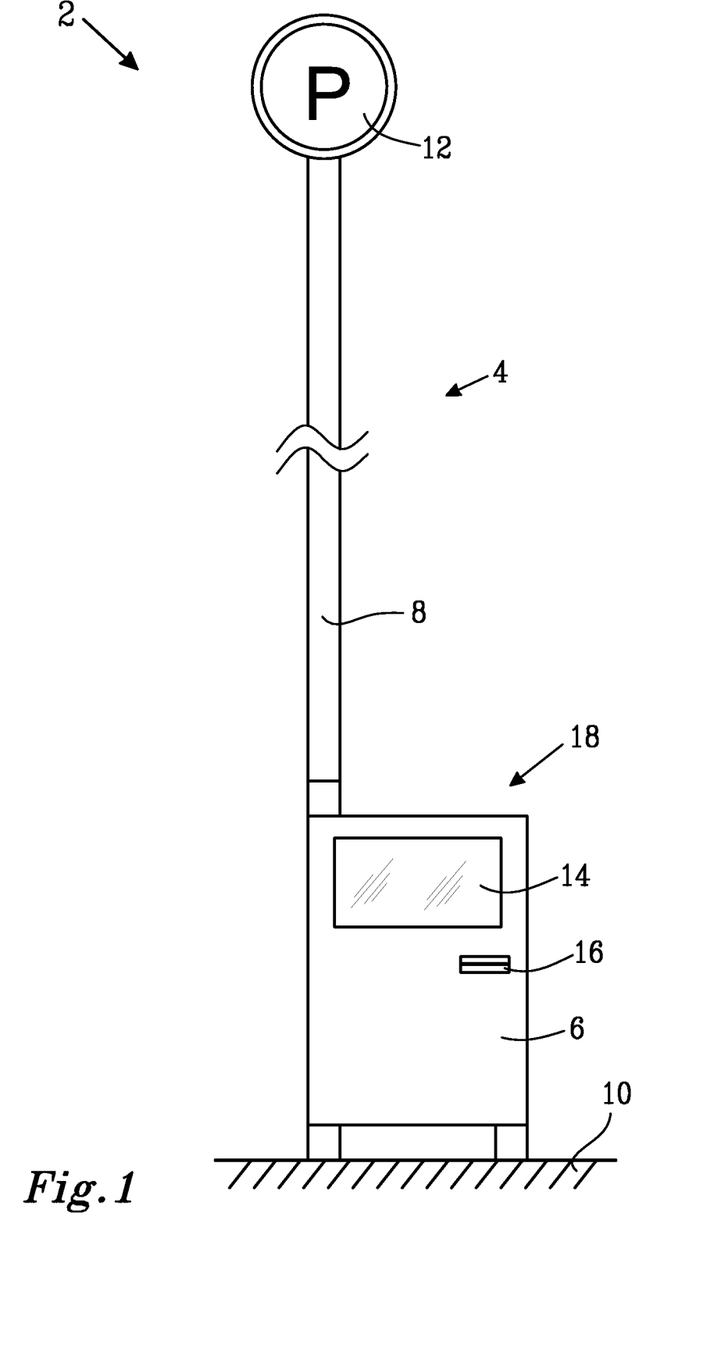
FIGS. 1-3 illustrate antenna masts according to embodiments.

FIG. 1 illustrates an antenna mast 2 according to embodiments. The antenna mast 2 comprises a mast body 4 comprising a lower module 6 and an upper module 8. The lower module 6 is attached to the ground 10 and supports the mast body 4 and the antenna mast 2 in its upright position. The lower module 6 and the upper module 8 have been assembled to form the mast body 4. The lower module 6 and the upper module 8 have been selected from a set of modules comprising different lower modules and different upper modules.

The antenna mast 2 forms part of a wireless communication system. At an upper end of the antenna mast 2 the upper module supports an antenna arrangement of the wireless communication system. The mast body 4 may house a transceiver arrangement and a processor of the wireless communication system. The transceiver arrangement may comprise a separate transmitter and a separate receiver, or a combined transceiver. Also the transceiver arrangement and the processor may be comprised in one unit. The antenna arrangement, the transceiver arrangement and the processor are involved in communication between random users of the wireless communication system, such as two persons communicating via mobile telephone or a wireless device which via a web browser accesses a website stored on a server.

The lower module 6 carries the weight of the upper module 8, and the antenna arrangement as well as any transceiver arrangement and processor in the mast body 4.

The upper module 8 comprises a device to be utilized for a further function, i.e. a function other than supporting the antenna arrangement. In these embodiments the device to be utilized for the further function of the upper module is a sign 12. In these embodiments the sign 12 indicates a vehicle parking facility. The antenna arrangement supported by the antenna mast is arranged inside the sign 12.

The lower module 6 comprises devices to be utilized for further functions. A first device comprises an electronic screen 14 on which information may be presented. The screen 14 may be a touch screen such that a user may provide input to the first device. A second device comprises a card-reading device 16. The card-reading device 16 may for instance read plastic cards provided with a magnetic strip and/or a readable chip, such as a credit card. A third device to be utilized for a further function is a parking meter 18 comprising the electronic screen 14 and the card-reading device 16. A vehicle owner who desires to park his vehicle in the parking facility indicated by the sign 12 may thus receive information about the parking fee via the screen 14 and via the touch screen input the duration for parking the vehicle. The user may insert a credit card in the card-reading device 16 to pay for parking the vehicle. A receipt may be printed by a non-shown printer. The printer may form a fourth device to be utilized for a further function of the lower module 6.

Figure 2:
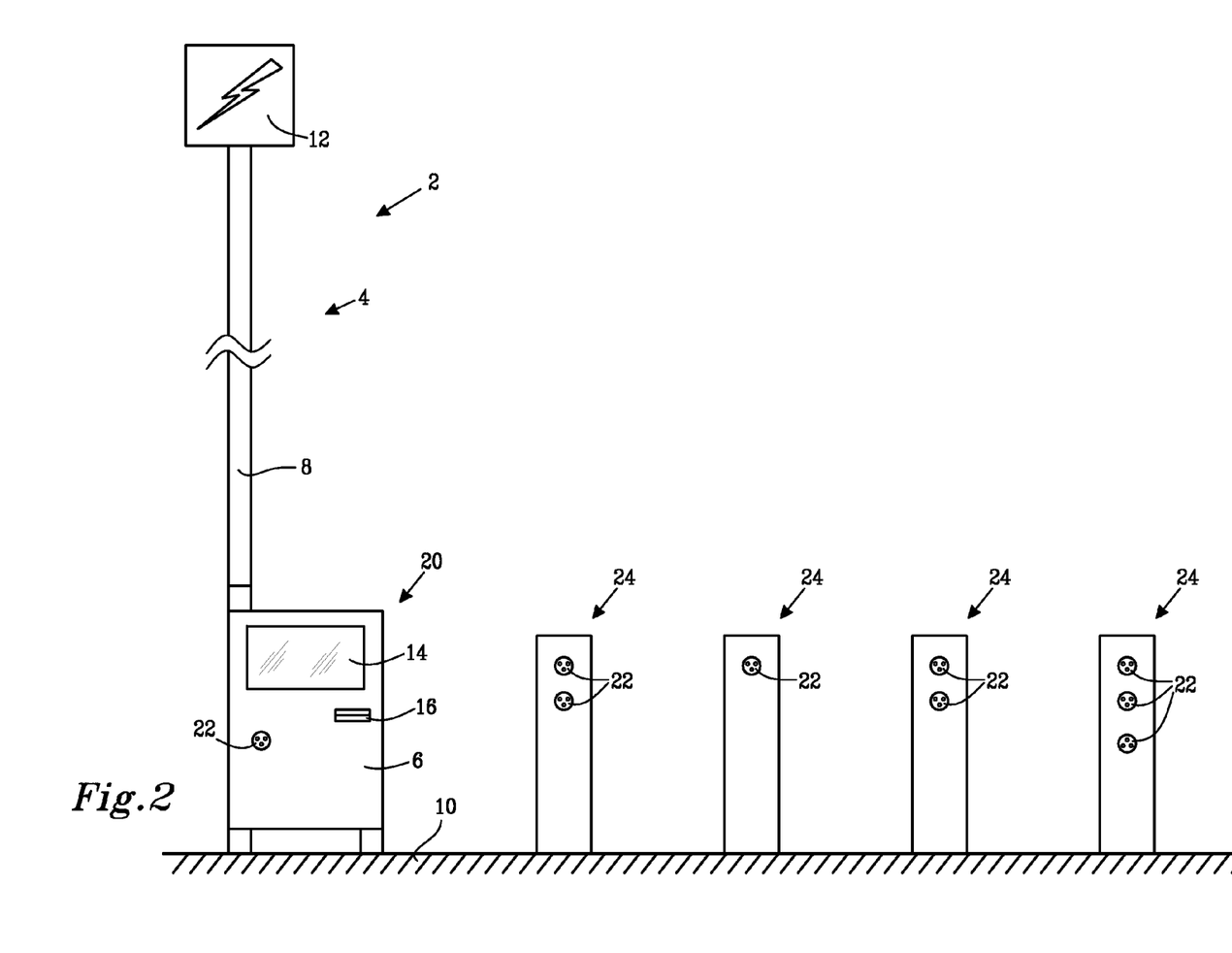

FIG. 2 illustrates an antenna mast 2 according to embodiments. The antenna mast 2 comprises a mast body 4 comprising a lower module 6 and an upper module 8. Again, the lower module 6 is attached to the ground 10 and supports the mast body 4 and the antenna mast 2 in its upright position. The mast body 4 has been assembled from the lower module 6 and the upper module 8, which have been selected from a set of modules comprising different lower modules and different upper modules.

Again, the antenna mast 2 forms part of a wireless communication system and at an upper end of the antenna mast 2, the upper module 8 supports an antenna arrangement of the wireless communication system. The mast body 4 may house a transceiver arrangement and a processor of the wireless communication system.

The upper module 8 comprises a device to be utilized for a further function in the form of a sign 12 and the lower module 6 comprises several devices to be utilized for further functions.

In these embodiments the antenna mast 2 comprises an arrangement 20 for charging an electric vehicle. Accordingly, the sign 12 indicates such an arrangement. The lower module 6 thus comprises a device to be utilized for a further function in the form of an arrangement 20 for charging an electric vehicle. The arrangement 20 comprises three devices to be utilized for a further function; a first device comprising an electronic screen 14, a second device comprising a card-reading device 16, and a third device comprising an electric power socket 22. The electronic screen 14 and the card-reading device 16 may function as mentioned above in connection with the parking meter. The electric power socket 22 is provided for an owner of an electric vehicle to charge the electric vehicle. A number of separate charging posts 24, each comprising one or more electric power sockets 22, may be connected to the arrangement 20 for charging an electronic vehicle. A user desiring to charge a vehicle may thus be directed by instructions on the screen 14 to an available power socket 22 on one of the posts 24 for charging the vehicle.

The lower modules 6 and the upper modules 8 illustrated in FIGS. 1 and 2 form part of a set of modules. Accordingly, the set of modules comprises at least two different lower modules 6 and at least two different upper modules 8. The set of modules may comprise further lower modules 6 and/or upper modules 8 of the same kind as illustrated in FIGS. 1 and 2 and/or of a different kind than illustrated in FIGS. 1 and 2. An antenna mast system may comprise the set of modules. Thus, differently configured mast bodies 4 may be assembled from the set of modules. A method of providing an antenna mast 2 may thus comprise selecting a lower module 6 and an upper module 8 from a set of modules, and assembling a mast body 4 including the selected lower module 6 and the selected upper module 8 to form an assembled mast body 4.

Figure 3:
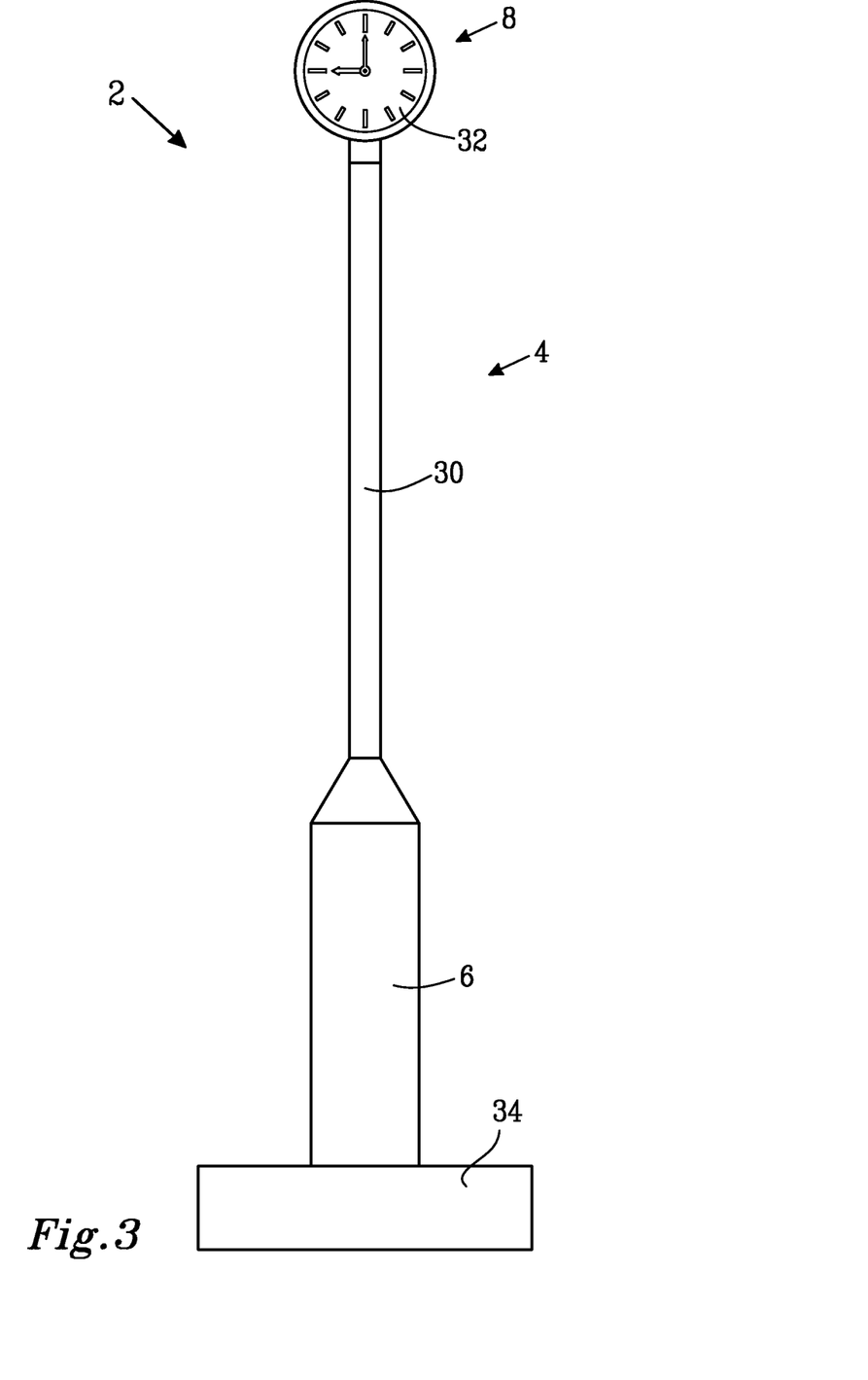

FIG. 3 illustrates an antenna mast 2 according to embodiments. The antenna mast 2 comprises a mast body 4 comprising a lower module 6, a middle module 30, and an upper module 8. The lower module 6 is attached to the ground and supports the mast body 4 and the antenna mast 2 in its upright position. The mast body 4 has been assembled from the lower module 6, the middle module 30, and the upper module 8, which have been selected from a set of modules comprising different lower modules, different middle modules, and different upper modules.

Again, the antenna mast 2 forms part of a wireless communication system and at an upper end of the antenna mast 2, the upper module 8 supports an antenna arrangement of the wireless communication system. The mast body 4 may house a transceiver arrangement and a processor of the wireless communication system. In these embodiments the antenna mast 2 is adapted to be placed at an antenna site where members of the public may want to sit down or may want to know the time of day, such as at a public transportation station or at a shopping centre. The upper module comprises a device to be utilized for a further function other than supporting the antenna arrangement in the form of a clock 32. The lower module 6 thus comprises a device to be utilized for a further function in the form of a bench 34. The middle module 30 in these embodiments forms an extension for positioning the clock 32 and the antenna arrangement of the upper module 8 at a suitable height, such as at 3-8 meters above the ground.

Figure 4A:
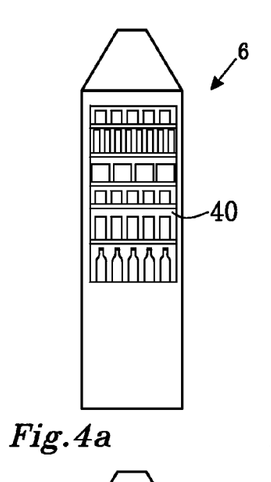
FIGS. 4a-4i illustrate embodiments of lower modules of antenna masts.
Figure 4B:
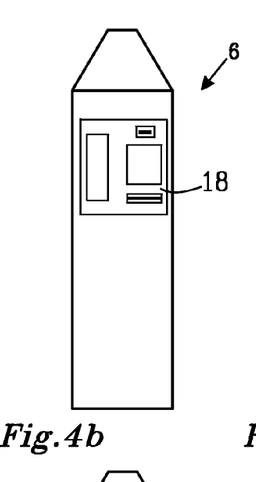
Figures 4C, 4D:
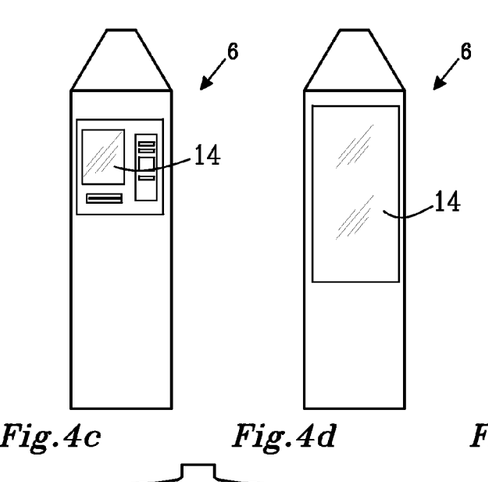
Figure 4E:
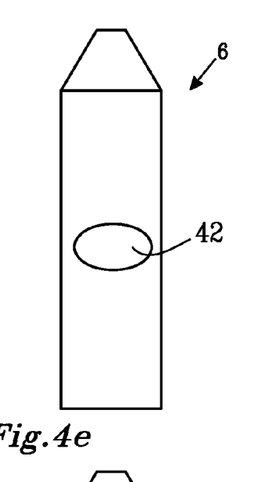
Figure 4F:
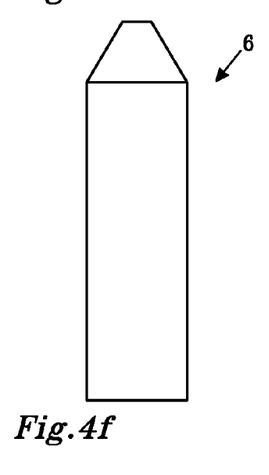
Figure 4G:
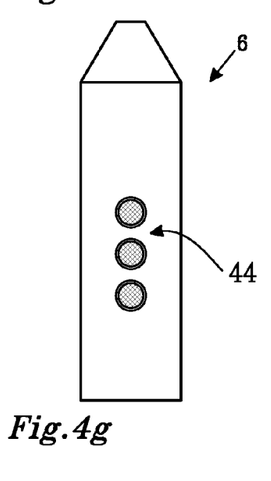
Figure 4H:
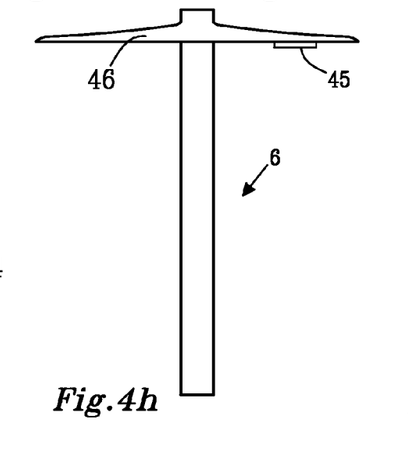
Figure 4I:
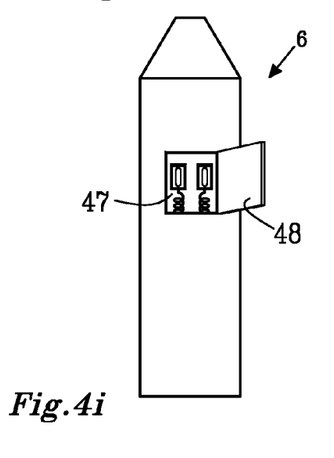

FIGS. 4*a*-4*i* illustrate embodiments of lower modules 6 of antenna masts. The lower modules 6 illustrated in FIGS. 4*a*-4*e*, and 4*g*-4*i* each comprise at least one device to be utilized for a further function, i.e. a function other than supporting an antenna arrangement of a relevant antenna mast. FIG. 4*a* illustrates a lower module 6 comprising a device to be utilized for a further function in the form of a vending machine 40. FIG. 4*b* illustrates a lower module 6 comprising a device to be utilized for a further function in the form of a parking meter 18. FIG. 4*c* illustrates a lower module 6 comprising a device to be utilized for a further function in the form of an electronic screen 14. FIG. 4*d* illustrates a lower module 6 comprising a device to be utilized for a further function in the form of an electronic screen 14. The electronic screens illustrated in FIGS. 4*c* and 4*d* are of different sizes. The larger screen 14 of FIG. 4*d* may be suited for public announcements or commercial messages whereas the smaller screen of FIG. 4*c* may be utilized for providing information to one person. FIG. 4*e* illustrates a lower module 6 comprising a device to be utilized for a further function in the form of a waste bin 42. FIG. 4*f* illustrates a lower module 6 without any device to be utilized for a further function. However, inside this lower module 6 there may be arranged parts of the wireless communication system. FIG. 4*g* illustrates a lower module 6 comprising a device to be utilized for a further function in the form of a traffic light 44 for a pedestrian or bicycle crossing. FIG. 4*h* illustrates a lower module 6 comprising a first device to be utilized for a further function in the form of a lighting arrangement 45, such as an electric lamp, and a second device to be utilized for a further function in the form of a roof arrangement 46. FIG. 4*i* illustrates a lower module 6 comprising a device to be utilized for a further function in the form of a defibrillator 47. At least the electrodes of the defibrillator 47 are arranged in a compartment inside the lower module 6. By opening a door 48 of the compartment at least the electrodes of the defibrillator 47 may be taken out of the compartment for aiding a person in need. At least one of the devices to be utilized for a further function illustrated in each of the FIGS. 4*a*-4*e*, and 4*g*-4*i* is housed substantially within the lower modules 6 and thus within an outer surface of the lower module 6. Portions of the devices which need to be accessible or visible in use are arranged at an outer surface of the lower module 6.

Figure 5A:
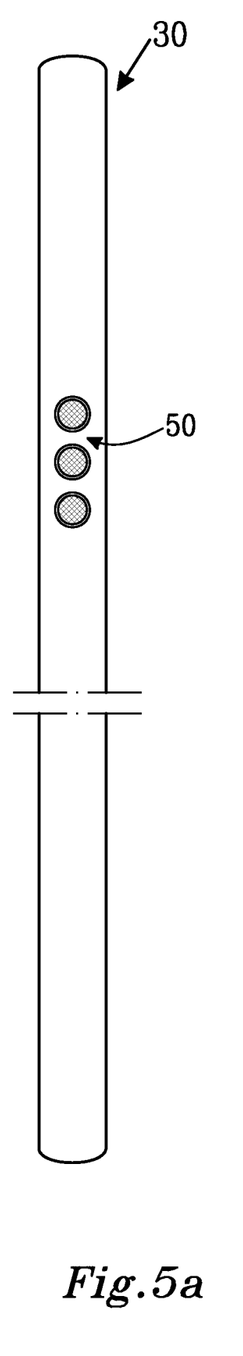
FIGS. 5a-5e illustrate embodiments of middle modules of antenna masts.
Figure 5B:
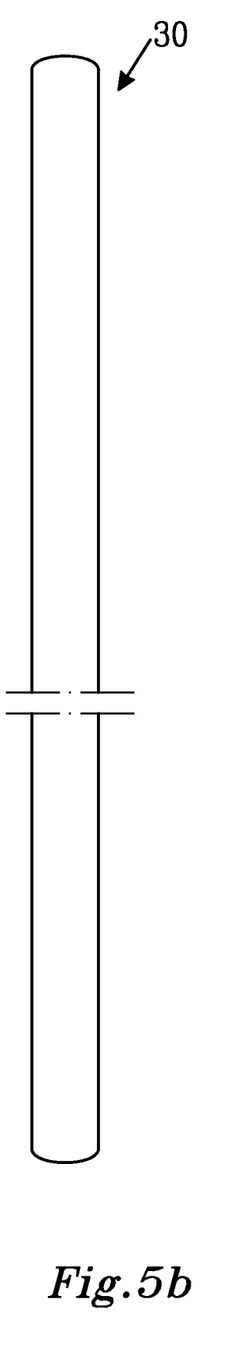
Figure 5C:
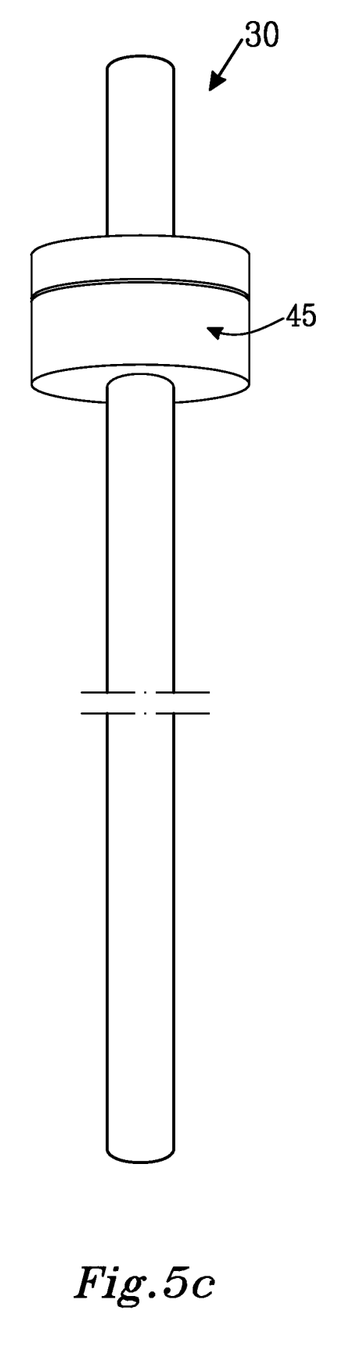
Figure 5D:
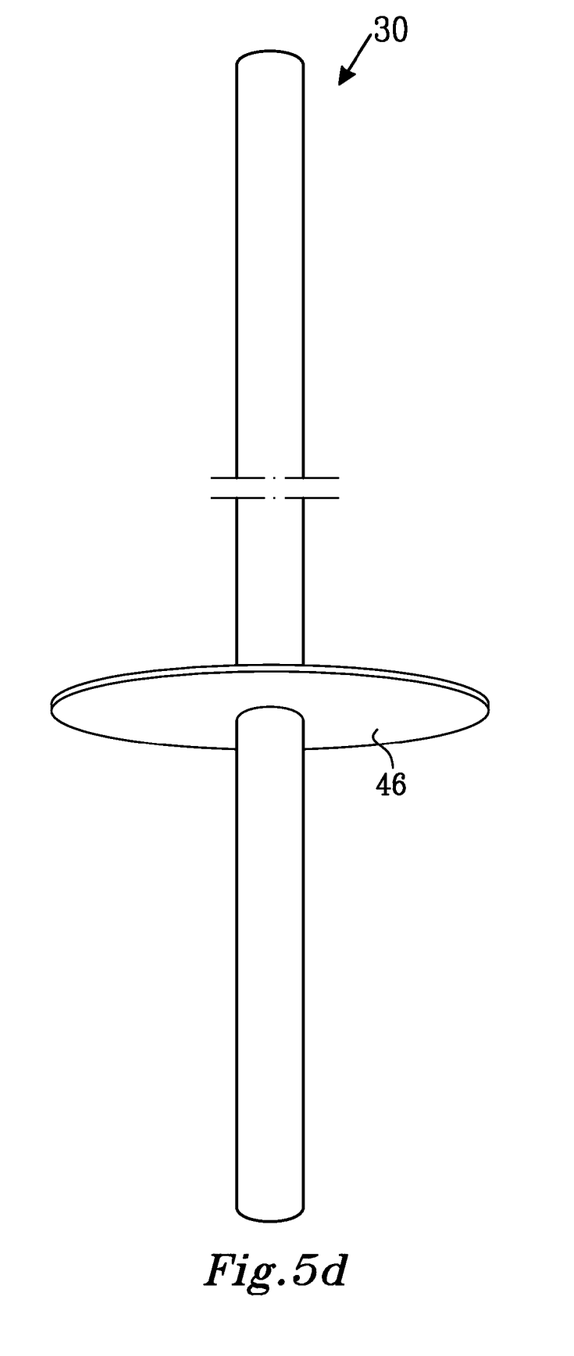
Figure 5E:
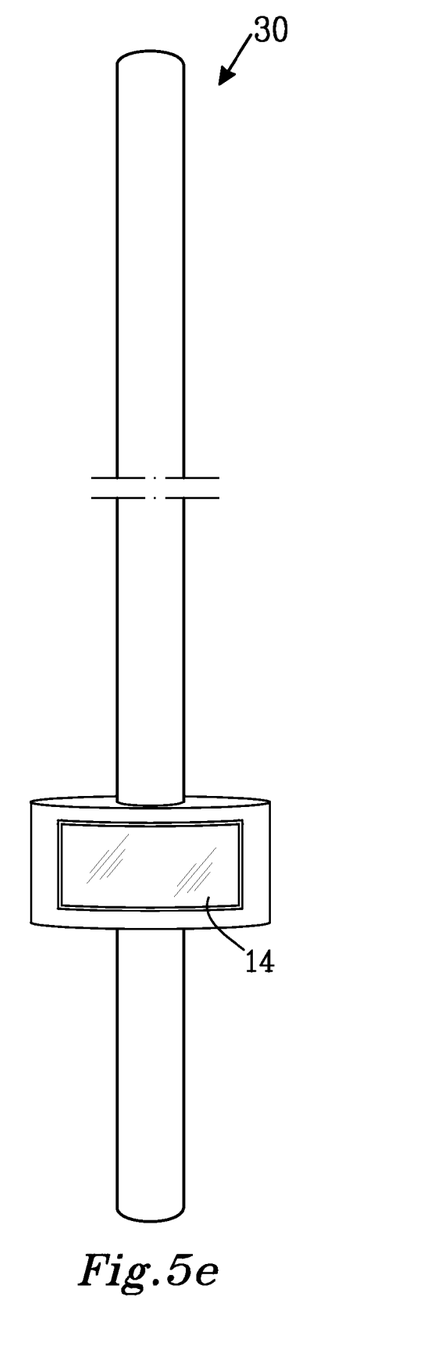

FIGS. 5*a*-5*e* illustrate embodiments of middle modules 30 of antenna masts. The middle modules 30 illustrated in FIGS. 5*a*, and 5*c*-5*e* each comprise at least one device to be utilized for a further function, i.e. a function other than supporting an antenna arrangement of a relevant antenna mast. FIG. 5*a* illustrates of a middle module 30 comprising a device to be utilized for a further function in the form of a traffic light 50. FIG. 5*b* illustrates a middle module 30 without any device to be utilized for a further function. Inside this middle module 30 there may be arranged parts of the wireless communication system. FIG. 5*c* illustrates embodiments of a middle module 30 comprising a device to be utilized for a further function in the form of a lighting arrangement 45. FIG. 5*d* illustrates embodiments of a middle module 30 comprising a device to be utilized for a further function in the form of a roof arrangement 46. FIG. 5*e* illustrates embodiments of a middle module 30 comprising a device to be utilized for a further function in the form of an electronic screen 14. The devices to be utilized for a further function illustrated in FIGS. 5*a*, 5*c*, and 5*e* are housed substantially within the middle modules 30 and thus within an outer surface of the middle modules 30.

Portions of the devices which need to be accessible or visible in use are arranged at an outer surface of the middle modules 30.

Figure 6A:
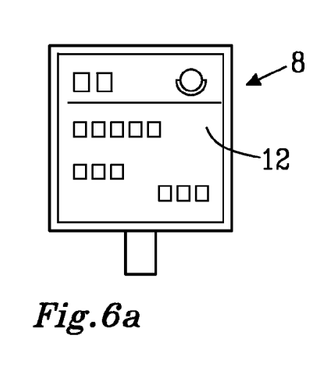
FIGS. 6a-6h illustrate embodiments of upper modules of antenna masts.
Figure 6B:
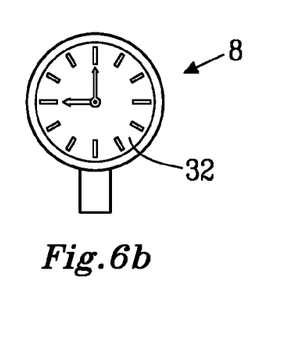
Figure 6C:
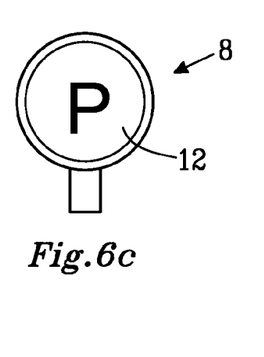
Figure 6D:
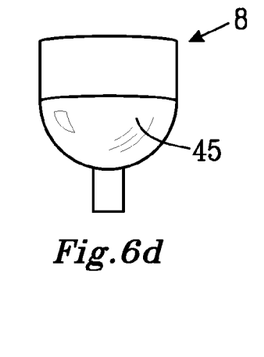
Figure 6E:
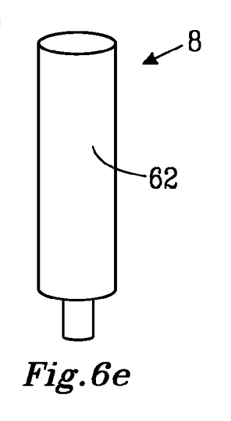
Figure 6F:
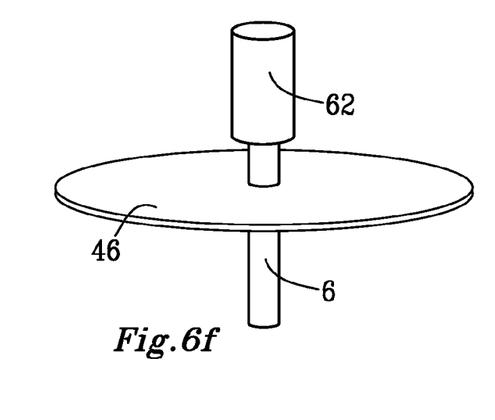
Figure 6G:
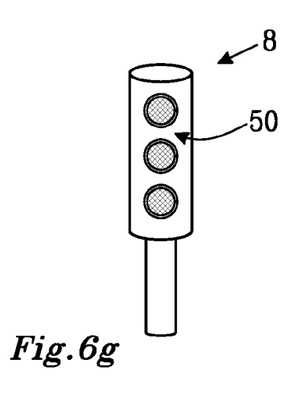
Figure 6H:
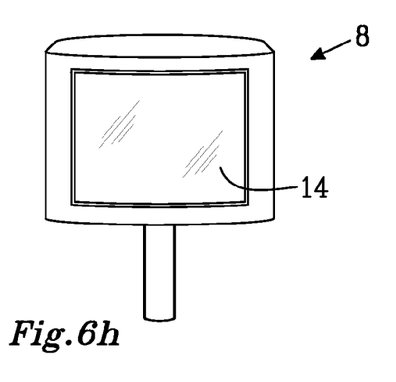

FIGS. 6a-6h illustrate embodiments of upper modules 8 of antenna masts. The upper modules 8 illustrated in FIGS. 6a-6h support an antenna arrangement of a wireless communication system. FIGS. 6a-6d, and 6f-6h each comprise at least one device to be utilized for a further function, i.e. a function other than supporting an antenna arrangement of a relevant antenna mast. FIG. 6a illustrates an upper module 8 comprising a device to be utilized for a further function in the form of a sign 12 for a public buss service. FIG. 6b illustrates an upper module 8 comprising a device to be utilized for a further function in the form of a clock 32. FIG. 6c illustrates an upper module 8 comprising a device to be utilized for a further function in the form of a parking sign 12. FIG. 6d illustrates an upper module 8 comprising a device to be utilized for a further function in the form of a lighting arrangement 45, such as an electric streetlamp. FIG. 6e illustrates an upper module 8 without any device to be utilized for a further function. Inside a shell 62 permeable to radio waves the antenna arrangement of a wireless communication system is arranged. FIG. 6f illustrates an upper module 8 comprising a device to be utilized for a further function in the form of a roof arrangement 46. Inside a shell 62 permeable to radio waves the antenna arrangement of a wireless communication system is arranged. FIG. 6g illustrates an upper module 8 comprising a device to be utilized for a further function in the form of a traffic light 50. FIG. 6h illustrates an upper module 8 comprising a device to be utilized for a further function in the form of an electronic screen 14.

The antenna arrangement is arranged inside each of the upper modules 8 illustrated in FIGS. 6a-6h. At least a portion of an outer surface of the upper modules 8 is permeable to radio waves. Further parts of the wireless communication system may also be arranged in any of the upper modules 8 illustrated in FIGS. 6a-6h. The devices to be utilized for a further function illustrated in FIGS. 6b, 6d, 6g, and 6h are housed substantially within the upper modules 8 and thus within an outer surface of the upper modules 8. Portions of the devices which need to be accessible or visible in use are arranged at an outer surface of the upper modules 8.

At least one of the lower modules 6 of FIGS. 4a-4i, at least one of the middle modules 30 of FIGS. 5a-5e, and at least one of the upper modules 8 of FIGS. 6a-6h together with at least one further of the lower modules 6 of FIGS. 4a-4i, or the middle modules 30 of FIGS. 5a-5e, or the upper modules 8 of FIGS. 6a-6h form a set of modules. Accordingly, the set of modules comprises at least two different lower modules 6, and/or at least two different middle modules 30, and/or at least two different upper modules 8. The set of modules may comprise all of, or a certain number of, the modules illustrated in FIGS. 4a-4i, 5a-5e, and 6a-6h. An antenna mast system may comprise the set of modules. Thus, differently configured mast bodies 4 may be assembled from the set of modules. A method of providing an antenna mast 2 may thus comprise selecting a lower module 6, a middle module 30, and an upper module 8 from the set of modules, and assembling a mast body 4 including the selected lower module 6, the selected middle module 30, and the selected upper module 8 to form an assembled mast body. An assemble mast body may look like the mast body 4 illustrated in FIG. 3 when the set of modules also comprises a lower module 6 comprising a device to be utilized for a further function in the form of a bench 34.

Figure 7:
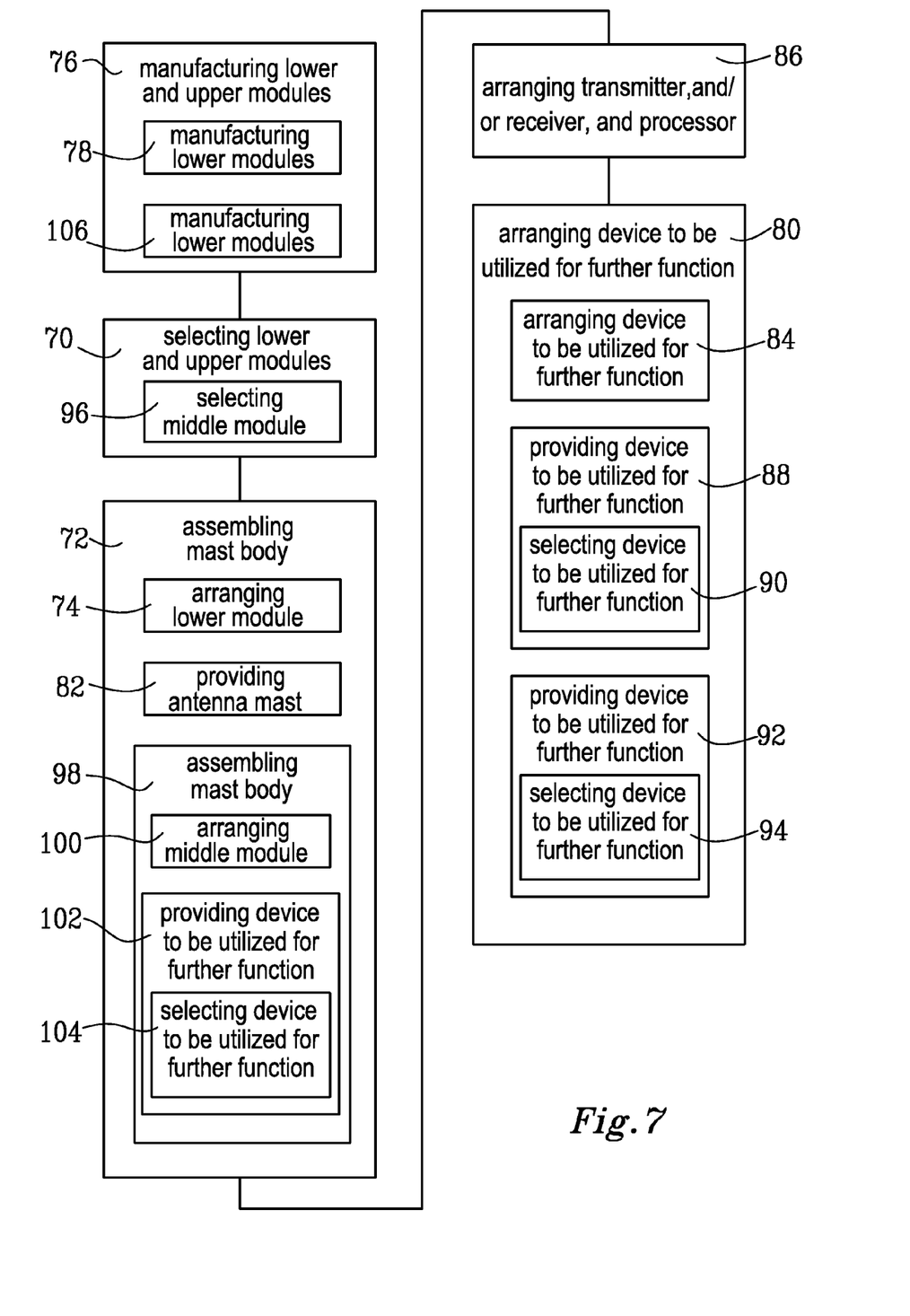
FIG. 7 is a flow chart illustrating embodiments of a method of providing an antenna mast for a wireless communication system.

FIG. 7 is a flow chart illustrating embodiments of a method of providing an antenna mast for a wireless communication system. The antenna mast 2 may be of the kind illustrated in FIGS. 1-3 and may comprise modules 6, 8, 30 as illustrated in FIGS. 4a-4i, 5a-5e, and 6a-6h. The antenna mast comprises a mast body adapted to form a supporting structure for an antenna arrangement of the wireless communication system. The mast body comprises a lower module and an upper module. The upper module is adapted to comprise the antenna arrangement. At least one of the lower module and the upper module is adapted to comprise a device to be utilized for a further function other than supporting the antenna arrangement. The method comprises:

Selecting 70 a lower module and an upper module from a set of modules comprising at least two different lower modules and/or at least two different upper modules.

Assembling 72 the mast body including the selected lower module and the selected upper module to form an assembled mast body. The further function may be a function other than a function directly related to the wireless communication system.

Assembling may comprise:

Arranging 74 the lower module substantially below the upper module in the assembled mast body.

The method may comprise:

Manufacturing 76 the lower modules, and the upper modules of the set of modules to form at least part of an outer surface of the assembled mast body.

The method may comprise:

Manufacturing 78 lower modules to form a supporting structure which is adapted to carry at least a weight of an upper module and devices arranged in the upper module of an assembled mast body.

The method may comprise:

Arranging 80 the device to be utilized for the further function substantially within the outer surface of the assembled mast body.

The method may comprise:

Providing 82 an antenna mast having a height of 3-8 meters.

The method may comprise:

Arranging 84 a particular device to be utilized for the further function in the assembled mast body in dependence of the selected modules from the set of modules.

The method may comprise:

Arranging 86 at least a transmitter, and/or a receiver, and a processor of the wireless communication system inside the selected lower and/or upper modules.

The method may comprise:

Providing 88 the device to be utilized for the further function in connection with the lower module of the assembled mast body.

The method may comprise:

Selecting 90 the device to be utilized for the further function from the group of: a bench, a roof arrangement, a waste bin, a vending machine, an electronic screen, a parking meter, a traffic light, a lighting arrangement, a card-reading device, an electric power socket, or a life-saving device such as a defibrillator.

The method may comprise:

Providing 92 the device to be utilized for performing the further function besides the antenna arrangement in connection with the upper module of the assembled mast body.

The method may comprise:

Selecting 94 the device to be utilized for the further function from a group of: a sign, a lighting arrangement, a clock, a roof arrangement, a traffic light, or an electronic screen.

If the set of modules comprises at least two different middle modules the method may comprise:

Selecting 96 a middle module from the set of modules, and assembling 72 comprises:

Assembling 98 the mast body including the selected middle module to form the assembled mast body. Assembling 98 the antenna mast body may comprise:

Arranging 100 the middle module substantially between the lower module and the upper module. The method may comprise:

Providing 102 the device to be utilized for the further function in connection with the middle module. The method may comprise:

Selecting 104 the device to be utilized for the further function in the middle module from a group of: a traffic light, an electronic screen, a roof arrangement, or a lighting arrangement. The method may comprise:

Manufacturing 106 the lower modules of the set of modules to form a supporting structure which is adapted to carry a weight of a middle module, an upper module, and devices arranged in the middle and upper modules.

Example embodiments described above may be combined as understood by a person skilled in the art. It is also understood by those skilled in the art that steps of the method illustrated in FIG. 7 may be performed in a different order than illustrated in FIG. 7. An antenna mast may comprise more than three modules. One or more further modules may be placed on top of the upper module of a mast body of an antenna mast. The different modules of a mast body may be assembled in such a manner or using such method that they may be separated again, alternatively one or more of the different modules may be permanently attached to each other such that only mechanical damage will separate the modules. The modules may be provided with connecting elements, such as flanges or sleeves, to allow easy fitting and attachment of the lower module with a middle module or an upper module, and a middle module with an upper module. One or more antennas may be arranged such that they are visible from an outside of the antenna mast. A further device to be utilized for a further function may comprise a monitoring arrangement for instance comprising a surveillance camera. An antenna mast may have a height of 3-8 meters. Antenna masts may also have a higher height such as up to 15 meters.

Therefore, it is to be understood that the foregoing is illustrative of various example embodiments and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

The invention claimed is:

1. A method of providing an antenna mast for a wireless communication system, the method comprising:

selecting a lower module and an upper module from a set of modules, wherein the set of modules comprises either:
 one or more upper modules and two or more different kinds of lower modules, wherein the two or more different kinds of lower modules have the same connecting element for interchangeably connecting to a connecting element of an upper module;
 one or more lower modules and two or more different kinds of upper modules, wherein the two or more different kinds of upper modules have the same connecting element for interchangeably connecting to a connecting element of a lower module; or
 two or more different kinds of lower modules and two or more different kinds of upper modules;
 wherein lower or upper modules of different kinds are configured to include therein different kinds of electronic devices that perform different functions; and assembling the selected lower module and the selected upper module into a mast body of the antenna mast that forms a supporting structure for an antenna arrangement of the wireless communication system, including the antenna arrangement in the selected upper module and including an electronic device in at least one of the selected lower module and the selected upper module, wherein the electronic device included in a selected module is a kind of electronic device for which that selected module is configured;

wherein said assembling comprises:
 selecting from a first plurality of different electronic devices a first electronic device in the form of an electronic screen configured to display public announcements or commercial messages;
 including the electronic screen substantially within the outer surface of the selected lower module, such that at least a portion of the electronic screen is arranged at the selected lower module's outer surface so as to be visible;
 selecting from a second plurality of different electronic devices a second electronic device in the form of a clock;
 including the clock substantially within the outer surface of the selected upper module, such that at least a portion of the clock is arranged at the selected upper module's outer surface so as to be visible;
 arranging the lower module substantially below the upper module in the assembled mast body;

including a processor and at least one of a transmitter and a receiver of the wireless communication system inside at least one of the selected lower and upper modules; and wherein at least a portion of the upper module's outer surface is permeable to radio waves.

2. The method according to claim 1, wherein two or more of the different kinds of electronic devices perform different functions not directly related to the wireless communication system.

3. The method according to claim 1, further comprising manufacturing the lower modules and the upper modules of the set to form at least part of an outer surface of an assembled mast body.

4. The method according to claim 1, further comprising manufacturing lower modules to form a supporting structure that supports at least the weight of an upper module and devices included in that upper module.

5. The method according to claim 1, wherein said assembling comprises assembling the mast body to have a height between 3 and 8 meters.

6. The method according to claim 1, wherein said assembling comprises including different electronic devices in the assembled mast body based on the particular modules selected from the set of modules.

7. The method according to claim 1, wherein said first plurality of different electronic devices include two or more of a waste bin, a vending machine, an electronic screen, a parking meter, a traffic light, a lighting arrangement, a card-reading device, an electric power socket, and a life-saving device.

8. The method according to claim 1, wherein said second plurality of different devices include two or more of a sign, a lighting arrangement, a clock, a traffic light, and an electronic screen.

9. The method according to claim 1, wherein the set of modules further comprises at least two different middle modules that have the same connecting element for interchangeably connecting to a connecting element of a lower module and the same connecting element for interchangeably connecting to a connecting element of an upper module, wherein said selecting further comprises selecting a middle module from the set of modules, and wherein said assembling comprises assembling the selected middle module together with the selected lower and upper modules to form the assembled mast body.

10. The method according to claim 9, wherein said assembling comprises arranging the selected middle module substantially between the selected lower module and the selected upper module.

11. The method according to claim 9, wherein said assembling comprises including an electronic device in the selected middle module, wherein that electronic device is a kind of electronic device for which the selected middle module is configured.

12. The method according to claim 11, further comprising selecting the electronic device to include in the middle module from a plurality of different electronic devices, wherein said plurality of different electronic devices include a traffic light, an electronic screen, and a lighting arrangement.

13. The method according to claim 9, wherein a lower module is configured to form a supporting structure that supports the weight of a middle module, an upper module, and devices included in the middle and upper modules.

14. The method according to claim 1, wherein the set of modules comprises two or more different kinds of lower modules and two or more different kinds of upper modules, wherein the two or more different kinds of upper modules have the same connecting element for interchangeably connecting to the two or more different kinds of lower modules.

15. The method according to claim 1, wherein at least one of the electronic screen and the clock is configured to communicate with a service provider via the wireless communication system.

16. The method according to claim 15, wherein at least one of the electronic screen and the clock is configured to communicate its status of operation to said service provider via the wireless communication system.

17. A modular antenna mast system comprising a set of modules, including lower modules and upper modules, wherein at least two of the lower modules, at least two of the upper modules, or both are different from one another in kind, wherein lower or upper modules of different kinds are configured to include therein different kinds of electronic devices that perform different functions, wherein said at least two of the lower modules have the same connecting element for interchangeably connecting to a connecting element of at least one of the upper modules, wherein said at least two of the upper modules have the same connecting element for interchangeably connecting to a connecting element of at least one of the lower modules, wherein different pairs of lower and upper modules are configured to assemble together into differently configured mast bodies of antenna masts for a wireless communication system, wherein each mast body forms a supporting structure for an antenna arrangement of the wireless communication system, has an upper module configured to include the antenna arrangement, and has either an upper module, a lower module, or both configured to include therein one of said different kinds of electronic devices for which that module is configured, wherein a lower module is configured to assemble into a mast body at a position substantially below that of a paired upper module, wherein at least a portion of the upper module's outer surface is permeable to radio waves, wherein at least one of the differently configured mast bodies is configured to house therein a processor and at least one of a transmitter and a receiver of the wireless communication system, wherein at least one lower module in the set of modules is configured to include an electronic screen substantially within the outer surface of that lower module, such that at least a portion of the electronic screen is arranged at the lower module's outer surface so as to be visible, and wherein at least one upper module in the set of modules is configured to include a clock substantially within the outer surface of that upper module, such that at least a portion of the clock is arranged at the upper module's outer surface so as to be visible.

18. The modular antenna mast system according to claim 17, wherein two or more of the different kinds of electronic devices perform different functions not directly related to the wireless communication system.

19. The modular antenna mast system according to claim 17, wherein a lower module and an upper module are configured to form at least part of an outer surface of an assembled mast body.

20. The modular antenna mast system according to claim 17, wherein a lower module is configured to form a supporting structure that supports at least the weight of an upper module and devices included in that upper module.

21. The modular antenna mast system according to claim 17, wherein at least some of said antenna masts are configured to have a height between 3 and 8 meters.

22. The modular antenna mast system according to claim 17, wherein the differently configured mast bodies include different kinds of electronic devices that perform different functions.

23. The modular antenna mast system according to claim 17, wherein lower modules of different kinds are configured to include therein different kinds of electronic devices that include two or more of a waste bin, a vending machine, an electronic screen, a parking meter, a traffic light, a lighting arrangement, a card-reading device, an electric power socket, and a life-saving device.

24. The modular antenna mast system according to claim 17, wherein upper modules of different kinds are configured to include therein different kinds of electronic devices that include two or more of a sign, a lighting arrangement, a clock, a traffic light, and an electronic screen.

25. The modular antenna mast system according to claim 17, wherein the set of modules further comprises at least two different middle modules that have the same connecting element for interchangeably connecting to a connecting element of a lower module and the same connecting element for interchangeably connecting to a connecting element of an upper module, and wherein at least one of the differently configured mast bodies comprises a middle module assembled together with a pair of lower and upper modules.

26. The modular antenna mast system according to claim 25, wherein a middle module is positioned substantially between a lower module and an upper module of an assembled mast body.

27. The modular antenna mast system according to claim 25, wherein at least one middle module in the set of modules is configured to include one of said different kinds of electronic devices.

28. The modular antenna mast system according to claim 25, wherein different middle modules are configured to include therein different kinds of electronic devices that include two or more of a traffic light, an electronic screen, and a lighting arrangement.

29. The modular antenna mast system according to claim 17, wherein the set of modules comprises two or more different kinds of lower modules and two or more different kinds of upper modules, wherein the two or more different kinds of upper modules have the same connecting element for interchangeably connecting to the two or more different kinds of lower modules.

30. The modular antenna mast according to claim 17, wherein at least one of the electronic screen and the clock is configured to communicate with a service provider via the wireless communication system.

31. The modular antenna mast according to claim 30, wherein at least one of the electronic screen and the clock is configured to communicate its status of operation to said service provider via the wireless communication system.

\* \* \* \* \*

UNITED STATES PATENT AND TRADEMARK OFFICE
CERTIFICATE OF CORRECTION

PATENT NO. : 8,970,438 B2  
APPLICATION NO. : 13/025531  
DATED : March 3, 2015  
INVENTOR(S) : Häger et al.

Page 1 of 1

It is certified that error appears in the above-identified patent and that said Letters Patent is hereby corrected as shown below:

Specification

In Column 11, Line 12, delete "buss" and insert -- bus --, therefor.

Claims

In Column 18, Line 19, in Claim 30, delete "mast" and insert -- mast system --, therefor.

In Column 18, Line 23, In Claim 31, delete "mast" and insert -- mast system --, therefor.

Signed and Sealed this  
Sixteenth Day of February, 2016

Michelle K. Lee  
*Director of the United States Patent and Trademark Office*